United States Patent
Feng et al.

(10) Patent No.: US 11,081,029 B2
(45) Date of Patent: Aug. 3, 2021

(54) METHOD FOR EVALUATING BRIGHTNESS MEASUREMENT ACCURACY OF DEMURA EQUIPMENT

(71) Applicant: WUHAN JINGCE ELECTRONIC GROUP CO., LTD., Wuhan (CN)

(72) Inventors: Xiaofan Feng, Wuhan (CN); Zengqiang Zheng, Wuhan (CN); Zhao Liu, Wuhan (CN); Erwei Ma, Wuhan (CN); Hongjun Wu, Wuhan (CN); Ronghua Liu, Wuhan (CN); Yafei Shen, Wuhan (CN)

(73) Assignee: WUHAN JINGCE ELECTRONIC GROUP CO., LTD., Wuhan (CN)

(*) Notice: Subject to any disclaimer, the term of this patent is extended or adjusted under 35 U.S.C. 154(b) by 0 days.

(21) Appl. No.: 16/606,773

(22) PCT Filed: Jul. 9, 2018

(86) PCT No.: PCT/CN2018/094935
§ 371 (c)(1),
(2) Date: Oct. 21, 2019

(87) PCT Pub. No.: WO2019/237444
PCT Pub. Date: Dec. 19, 2019

(65) Prior Publication Data
US 2020/0380897 A1    Dec. 3, 2020

(30) Foreign Application Priority Data
Jun. 13, 2018  (CN) .......................... 201810608731.2

(51) Int. Cl.
*G09G 3/00* (2006.01)
*G06F 7/58* (2006.01)
*G09G 3/20* (2006.01)

(52) U.S. Cl.
CPC ............. *G09G 3/006* (2013.01); *G06F 7/588* (2013.01); *G09G 3/2003* (2013.01);
(Continued)

(58) Field of Classification Search
CPC ................. G09G 3/006; G09G 3/2003; G09G 2320/0673; G09G 2320/0276; G09G 2300/0452; G06F 7/588
See application file for complete search history.

(56) References Cited

U.S. PATENT DOCUMENTS

2005/0276502 A1* 12/2005 Brown Elliott ......... G06T 5/004
382/254
2017/0243562 A1* 8/2017 Hu ........................... G09G 5/10

FOREIGN PATENT DOCUMENTS

| CN | 103198801 | 7/2013 |
| CN | 107918216 | 4/2018 |
| KR | 101696609 | 1/2017 |

OTHER PUBLICATIONS

"International Search Report (Form PCT/ISA/210) of PCT/CN2018/094935," dated Dec. 6, 2018, pp. 1-4.

* cited by examiner

*Primary Examiner* — Alexander Eisen
*Assistant Examiner* — Kebede T Teshome
(74) *Attorney, Agent, or Firm* — JCIPRNET

(57) ABSTRACT

The invention discloses a method for evaluating a brightness measurement accuracy of a Demura equipment by generating a noise-added image by adding a random number to an original grayscale image and obtaining a measurement value corresponding to the added random number via the noise-added image displayed by the Demura equipment. The brightness measurement accuracy of the Demura equipment is evaluated based on a correlation between the measured value and the originally added random number to measure a (Continued)

brightness extraction performance of the Demura equipment. The method provided by the invention provides a quantitative and measurable determining method that may better reflect the actual performance of the Demura equipment.

18 Claims, 2 Drawing Sheets

(52) U.S. Cl.
CPC ............... *G09G 2300/0452* (2013.01); *G09G 2320/0276* (2013.01); *G09G 2320/0673* (2013.01)

METHOD FOR EVALUATING BRIGHTNESS MEASUREMENT ACCURACY OF DEMURA EQUIPMENT

CROSS-REFERENCE TO RELATED APPLICATION

This application is a 371 of international application of PCT application serial no. PCT/CN2018/094935, filed on Jul. 9, 2018, which claims the priority benefit of China application no. 201810608731.2, filed on Jun. 13, 2018. The entirety of each of the above mentioned patent applications is hereby incorporated by reference herein and made a part of this specification.

BACKGROUND OF THE INVENTION

Field of the Invention

The invention belongs to the technical field of novel display panel defect recognition such as OLED, and more particularly to a method for evaluating the brightness data measurement accuracy of a Demura equipment.

Description of Related Art

An OLED (organic light-emitting diode)/microOLED Demura (Mura elimination) equipment is used to extract the brightness of a panel, calculate a compensation data, externally compensate a Mura defect appearing in the panel production, reduce or eliminate the Mura defect, and improve the display effect and yield of the product. Since the difference in the brightness extraction accuracy of the Demura equipment directly affects the compensation effect, the performance of the equipment needs to be evaluated. The accuracy here refers to the accuracy of sub-pixel brightness extraction of the display panel, that is, the deviation between the measured value of the sub-pixel brightness of the display panel and the true value.

In the prior art, the performance evaluation of the OLED/microOLED Demura equipment adopts a method such as SNR, crosstalk value, and human eye checking the compensation effect, but there is no uniform standard. The signal-to-noise ratio (SNR) indicator may reflect the performance of measurement repeatability of the Demura equipment, that is, the deviation of multiple measurements, but it cannot accurately reflect the measurement accuracy of the Demura equipment, that is, the deviation between the measured value and the true value. The crosstalk value indicator may reflect the measurement space accuracy of the Demura equipment, but it also cannot accurately reflect the measurement accuracy of the Demura equipment. The way the human eye checking the compensation effect is the ultimate standard of evaluating the Demura equipment quality, but it is affected by the subjective feelings of the person, and is interfered by the compensation algorithm, which is difficult to quantify and difficult to implement.

The prior art cannot accurately evaluate the repair effect of the Demura equipment on Muras such as Sandy Mura (sand-like Mura). Testing, research, and production in the field of liquid crystal panels have placed an urgent need on techniques for accurately evaluating the brightness data measurement accuracy of Demura equipment.

SUMMARY OF THE INVENTION

In view of the above drawbacks or the improved needs in the prior art, the invention provides a method for evaluating the brightness measurement accuracy of a Demura equipment, the object of which is to improve the accuracy of the brightness measurement accuracy evaluation of the Demura equipment.

To implement the above object, one aspect of the invention provides a method for evaluating the brightness measurement accuracy of a Demura equipment, which is generating a noise-added image by adding random numbers to a grayscale image, and obtaining a measured value corresponding to the added random numbers based on the noise-added image displayed by the Demura equipment, and evaluating the brightness measurement accuracy of the Demura equipment based on a correlation between the measured value and the originally-added random numbers.

Preferably, in the method for evaluating the brightness measurement accuracy of the Demura equipment, wherein a method of adding random variables is to superimpose one random number on each sub-pixel or to superimpose one random number on a few pixels per cycle, or to superimpose one random number on a random position.

Preferably, in the method for evaluating the brightness measurement accuracy of the Demura equipment, wherein the added random number is a value between ±10, preferably between 2 and 10.

Preferably, in the method for evaluating the brightness measurement accuracy of the Demura equipment, the correlation is $$r = \frac{cov(Rx_{Mesure}, Rx)}{\sqrt{var(Rx_{Mesure}) * var(Rx)}}$$

wherein Rx refers to the added random number, $Rx_{Measure}$ refers to the measured value corresponding to the added random number, $Cov(Rx_{Measure}, Rx)$ is a covariance of $Rx_{Measure}$ and Rx, $Var(Rx_{Measure})$ is a variance of $Rx_{Measure}$, and $Var(Rx)$ is a variance of Rx.

The invention provides a method for evaluating a brightness measurement accuracy of a Demura equipment, which specifically includes the following steps:

(1) driving an OLED/microOLED panel to display a plurality of images of different grayscales;

(2) extracting a brightness data of each sub-pixel of each of the images by using the Demura equipment to be evaluated;

(3) calculating a Gamma mapping relationship based on the brightness data of each sub-pixel and the corresponding grayscale of the sub-pixel;

(4) obtaining a noise-added image by adding one random number to an original input grayscale of a pixel of the images and adding different random numbers to different pixels;

(5) driving the OLED/microOLED panel to display the noise-added image and measuring a brightness of each sub-pixel of the displayed noise-added image;

(6) substituting the brightness of each sub-pixel in step (5) into the Gamma mapping relationship obtained based on step (3) and inversely calculating a grayscale measurement value and a random number measurement value corresponding to the brightness;

(7) obtaining a correlation between the random number measurement value and the added random number and evaluating the brightness measurement accuracy of the Demura equipment by using the correlation.

In general, the above technical solutions conceived by the invention may achieve the following beneficial effects compared with the prior art.

The method for evaluating the brightness measurement accuracy of the Demura equipment provided by the invention provides a standard repeatable execution flow and a quantitative measurable determination standard, and may be used as a unified standard for measuring the brightness extraction performance of the Demura equipment. Comparing the existing method for evaluating the accuracy of the Demura equipment by using the SNR test method with the method for evaluating the brightness measurement accuracy of the Demura equipment provided by the invention, the difference is that the method provided by the invention may measure the deviation between the test value and the actual value, that is, the accuracy, and the SNR may only measure the repeatability of multiple measurements of the equipment. Comparing with the existing method of using the crosstalk test method to evaluate the accuracy of the Demura equipment, the crosstalk test method may only measure the crosstalk between the panel subpixels and cannot measure the deviation between the measured value and the true value, which is, the accuracy. Since the accuracy is the determining factor in determining the compensation effect of the equipment, the method of the invention is not only more accurate but also more practical than the prior art.

DESCRIPTION OF THE EMBODIMENTS

Figure 1:
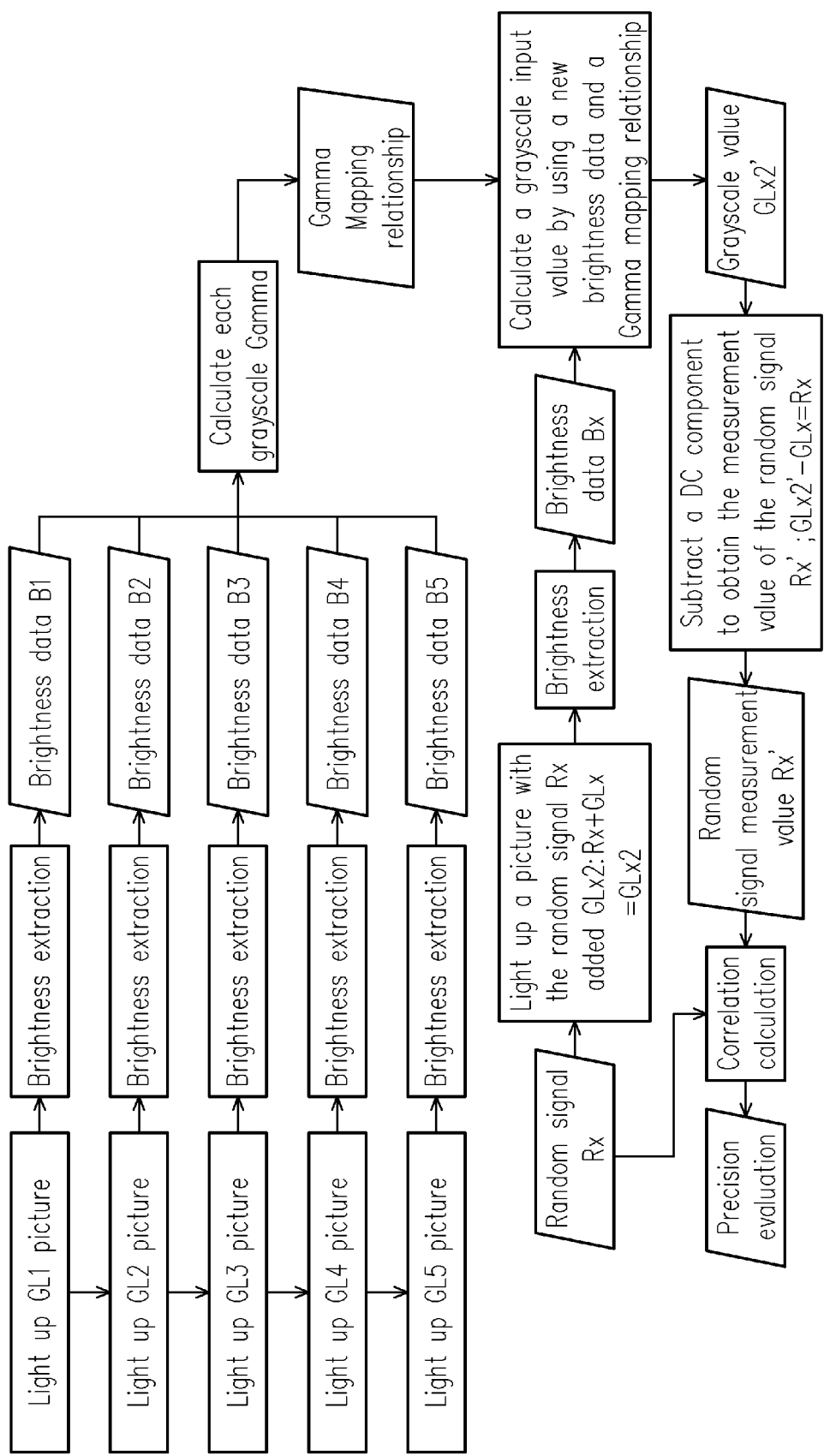
FIG. 1 is a flowchart of a method for evaluating brightness measurement accuracy of a Demura equipment provided by the invention.

In order to make the objects, technical solutions, and advantages of the invention clearer, the invention will be further described in detail below with reference to the accompanying drawings and embodiments. It is understood that the specific embodiments described herein are merely illustrative of the invention and are not intended to limit the invention. Further, the technical features involved in the various embodiments of the invention described below may be combined with each other as long as they do not interfere with each other.

The method for evaluating the brightness measurement accuracy of a Demura equipment provided by an embodiment includes the following steps.

(1) Drive the OLED/microOLED panel via a signal generator to display a plurality of images of different grayscales.

(2) Extract a brightness data of each sub-pixel of each of the images displayed by the OLED/microOLED panel via a Demura equipment.

(3) Calculate a Gamma mapping relationship based on the brightness data of each sub-pixel and a corresponding grayscale thereof.

(4) Obtain a noise-added image by adding one random quantity Rx (such as −5 to 5) to an original input grayscale (such as 128) of a pixel on different pixel points on the image; and add different random numbers to different pixels.

In this step, the added random number is equivalent to adding noise on the image, and the purpose is to obtain a random number measurement value via subsequent steps, thereby obtaining the deviation between the measured value and the actual added random number, and further determining the brightness measurement accuracy by the deviation.

(5) Drive the OLED/MicroOLED panel via the signal generator to display the noise-added image obtained in step (4), and measuring the brightness of each sub-pixel of the displayed noise-added image. The brightness data here is the brightness data after the addition of Rx.

(6) Substitute the brightness of each sub-pixel in step (5) into the Gamma mapping relationship obtained based on step (3) and inversely calculating the grayscale measurement value corresponding to the brightness and a random number measurement value Rx'.

In principle, the Gamma mapping relationship obtained in step (3) is a formula or a mapping table expressed as Brt=f(GL), wherein Brt is the measured brightness, GL is the actual input grayscale for the panel. GL=$f^{-1}$(Brt) is the inverse mapping of f. In step (6), a measured value of the input value grayscale GL', is calculated via a new brightness data Brt', GL'=$f^{-1}$(Brt').

(7) The correlation between the random number measurement value Rx' and the added random quantity Rx is obtained according to a range method, and the brightness measurement accuracy of the Demura equipment is evaluated by using the correlation.

The correlation is the quantity indicating the degree of linear correlation between variables; the correlation coefficient may be calculated by a product-moment method. The degree of correlation between the two variables may be reflected by multiplying the two deviations based on the deviations of the two variables and their respective average values.

In an embodiment, Rx is the input random number and Rx' is the measured value of the random number. The closer the correlation between the two is to 1, the closer the two are. The farther the correlation is from 1, the greater the deviation between the two. If the correlation of Rx and Rx' is 1, that is, the measured value is completely consistent with the actual value of the actually added random number, indicating that the Demura equipment may achieve the highest accuracy.

This will be further explained below in conjunction with FIG. 1 and specific examples.

(1) The seven pictures of G8, G16, G32, G64, G128, G192, and G255 are respectively displayed on a panel, and the brightness of each sub-pixel on the panel is respectively extracted to form a brightness matrix $Brt_{G8}$ $Brt_{G6}$ $Brt_{G32}$ $Brt_{G64}$ $Brt_{G128}$ $Brt_{G192}$ $Brt_{G255}$.

In this embodiment, green is used as an example. Red or blue may also be selected, or extracted from white, which is not limited. In particular, $Brt_{Gx}$ is a matrix of brightness values, the size of which is consistent with the actual green resolution of the panel, such as 1440*2880.

In the example, the seven grayscales of 8, 16, 32, 64, 128, 192, and 255 are selected. One can also select a test grayscale and one grayscale above and below the test grayscale. The value of the input grayscale and the number of grayscales are not strictly defined, in order to obtain an accurate Gamma mapping relationship of around the test grayscale.

(2) The Gamma mapping relationship Brt=(GL/255).^γ+b is obtained by using the $Brt_{G8}$ $Brt_{G16}$ $Brt_{G32}$ $Brt_{G64}$ $Brt_{G128}$ $Brt_{G192}$ $Brt_{G255}$ images and using an exponential function fitting method, Brt and GL are known quantities, γ and b are unknowns. The numerical matrix of γ and b is obtained by fitting. In this example, the Gamma mapping relationship obtained by the exponential function fitting method may also be obtained by other methods such as polynomial fitting, linear interpolation, and spline interpolation. The examples are not limited herein.

(3) The G128 grayscale is selected as the test, and the random number Rx is superimposed on the picture.

In this example, Rx is a matrix having a size consistent with the green resolution. The generation method is that each element of Rx takes a random integer between −10 and 10. The panel is lit up by using a picture G128'=G128+Rx with the added random number and the brightness is extracted to obtain a brightness matrix $Brt_{G128}'$.

The test grayscale G128 selected here is only an example, and is not limited. The grayscale may be any value between 0 and 255. Preferably, the test grayscale selecting from a value in the grayscale interval selected in step 1 is more accurate.

The random number generation method described here is only exemplary and is not limited. It may be one random number being superimposed on each sub-pixel, or one random number being superimposed on several pixels per cycle, or one random number being superimposed on a random position. The size of the random number, for example, is between ±10, and may be other intervals which is not limited. Preferably, the data between 2 and 10 is better, to avoid photosensitive saturation of the optical device.

(4) Grayscale measurement value $G128_{Measure}$ and random number measurement value $Rx_{Measure}$ are obtained by using the brightness data $Brt_{G128}'$ obtained in step 3 and the Gamma mapping relationship obtained in step 2:

$$G128_{Measure} = (Brt-b).\hat{}\gamma^{-1}*255.$$

Then the random number measurement value is $Rx_{Measure} = G128_{Measure} - G128$.

(5) The correlation r of the random number measurement value $Rx_{Measure}$ and the superimposed original random number Rx is obtained as the evaluation value of accuracy:

$$r = \frac{cov(Rx_{Mesure}, Rx)}{\sqrt{var(Rx_{Mesure})*var(Rx)}}$$

In particular, $Cov(Rx_{Measure}, Rx)$ is the covariance ($Rx_{Measure}$ and Rx, $Var(Rx_{Measure})$ is the variance of $Rx_{Measure}$ Var(Rx) is the variance of Rx. The closer the value of r is to 1, the closer the random number measurement value and the actually added random number. The farther the correlation r is from 1, the greater the deviation between the two. If the correlation r is 1, that is, the random number measurement value is completely consistent with the actually added random number, then the brightness measurement of the Demura equipment may achieve the highest accuracy.

Figure 2:
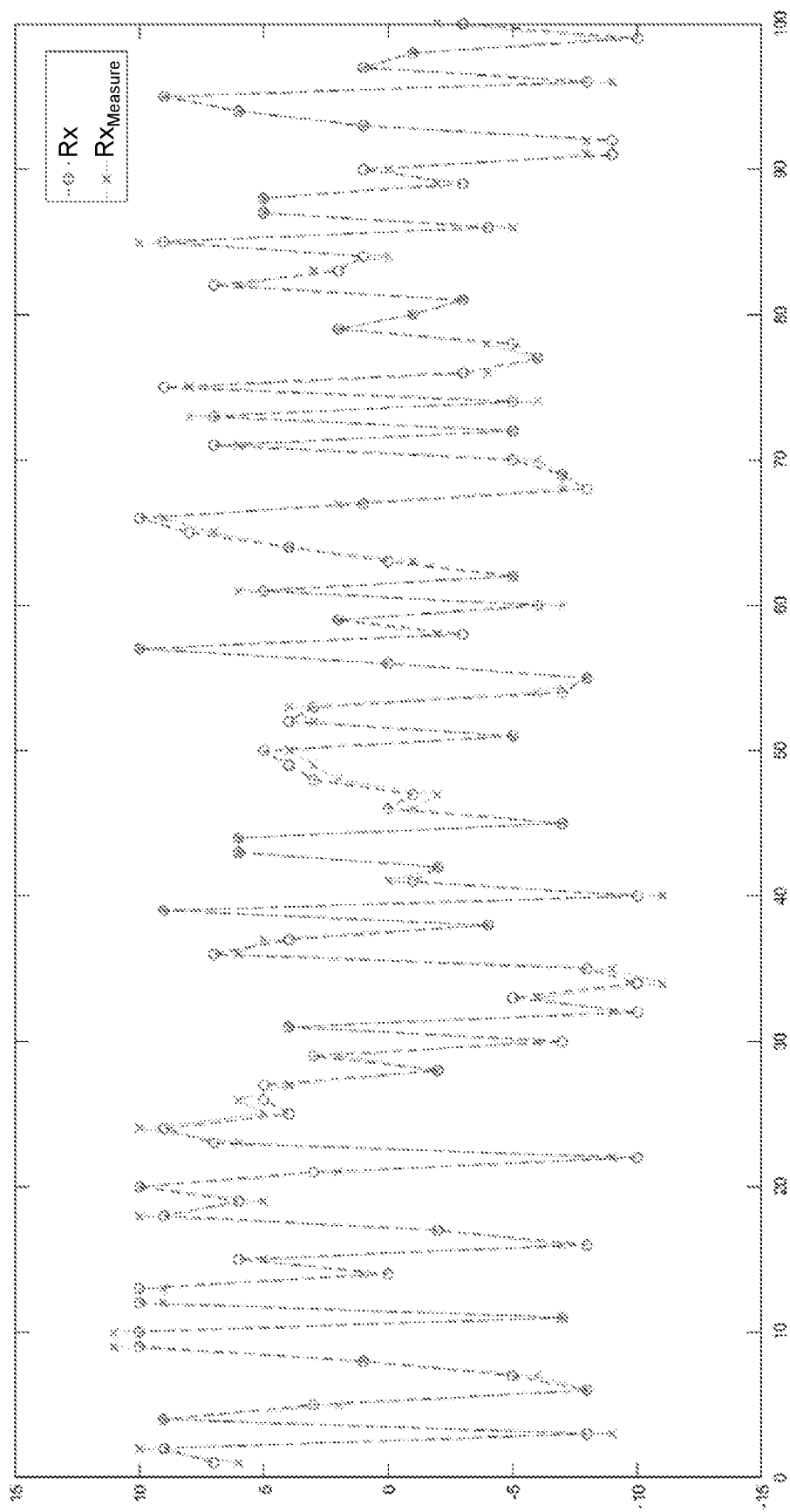
FIG. 2 is a graph of the relationship between random numbers and random number measurements added to a row of a panel in an embodiment.

FIG. 2 is a graph of a random number and a random number measurement value added to a row of a panel in an embodiment, wherein the horizontal axis represents the position of the pixel, and the vertical axis represents the grayscale. From this figure, the sizes of the actual value of the random number and the measurement value added on the row of the panel may be seen. It is seen that the deviation in the figure is generally within ±1. The method provided by the invention generates a noise-added image by adding a random number to the original grayscale image, and obtains a measurement value corresponding to the added random number via the noise-added image displayed by the Demura equipment, evaluates the brightness measurement accuracy of the Demura equipment based on the correlation between the measurement value and the originally-added random number, and measures the brightness extraction performance of the Demura equipment. This method may obtain a deviation between the test value and the actual value compared to the prior art by using the SNR or crosstalk test method to measure the brightness extraction performance of the Demura equipment, thus providing a quantitatively measurable determination standard that better reflects the actual performance of the Demura equipment.

Those skilled in the art will appreciate that the above description includes only preferred embodiments of the invention, and is not intended to limit the invention. Any modifications, equivalent substitutions, and improvements made within the spirit and principles of the invention should be included in the scope of protection of the invention.

What is claimed is:

1. A method for evaluating a brightness measurement accuracy of a Demura equipment, comprising:
   generating a noise-added image by adding random numbers to a grayscale image; and
   obtaining a measured brightness value of each sub-pixel corresponding to the added random numbers based on the noise-added image displayed by the Demura equipment; and
   evaluating the brightness measurement accuracy of the Demura equipment based on a correlation between the measured brightness value of each of the sub-pixel and the originally-added random numbers.

2. The method for evaluating the brightness measurement accuracy of the Demura equipment of claim 1, wherein a method of adding random numbers is to superimpose one random number on each of the sub-pixel or to superimpose one random number on a few pixels per cycle, or to superimpose one random number on a random position.

3. The method for evaluating the brightness measurement accuracy of the Demura equipment of claim 1, wherein the added random number is a value between ±10.

4. The method for evaluating the brightness measurement accuracy of the Demura equipment of claim 1, wherein the correlation is $$r = \frac{cov(Rx_{Measure}, Rx)}{\sqrt{var(Rx_{Measure})*var(Rx)}};$$

wherein Rx refers to the added random number, $Rx_{Measure}$ refers to the measured brightness value corresponding to the added random number, $COV(Rx_{Measure}, Rx)$ is a covariance of $Rx_{Measure}$ and Rx, $Var(Rx_{Measure})$ is a variance of $Rx_{Measure}$, and Var(Rx) is a variance of Rx.

5. A method for evaluating a brightness measurement accuracy of a Demura equipment, comprising the steps of:
   (1) driving a display panel to display a plurality of images of different grayscales;
   (2) extracting brightness of each sub-pixel of each of the images by using the Demura equipment to be evaluated;
   (3) calculating a Gamma mapping relationship based on the brightness of the each sub-pixel and a corresponding grayscale each of the sub-pixels;
   (4) obtaining a noise-added image by adding one random number to an original input grayscale of a pixel of the images and adding different random numbers to different pixels;

(5) driving the display panel to display the noise-added image and measuring brightness of each of the sub-pixels of the displayed noise-added image;

(6) substituting the brightness of each of the sub-pixels in step (5) into the Gamma mapping relationship obtained based on step (3) and inversely calculating a grayscale measurement value and a random number measurement value corresponding to the brightness;

(7) obtaining a correlation between the random number measurement value and the added random number and evaluating the brightness measurement accuracy of the Demura equipment by using the correlation.

6. The method for evaluating the brightness measurement accuracy of the Demura equipment of claim 5, wherein the Gamma mapping relationship is obtained by using an exponential function fitting, a polynomial fitting, a linear interpolation, or a spline interpolation.

7. The method for evaluating the brightness measurement accuracy of the Demura equipment of claim 5, wherein a method of adding random numbers is to superimpose one random number on each of the sub-pixels or to superimpose one random number on a few pixels per cycle, or to superimpose one random number on a random position.

8. The method for evaluating the brightness measurement accuracy of the Demura equipment of claim 5, wherein the added random number is a value between ±10.

9. The method for evaluating the brightness measurement accuracy of the Demura equipment of claim 5, wherein the correlation is $$r = \frac{cov(Rx_{Measure}, Rx)}{\sqrt{var(Rx_{Measure}) * var(Rx)}};$$

wherein Rx refers to the added random number, $Rx_{Measure}$ refers to a measured value corresponding to the added random number, $Cov(Rx_{Measure}, Rx)$ is a covariance of $Rx_{Measure}$ and Rx, $Var(Rx_{Measure})$ is a variance of $Rx_{Measure}$, and Var(Rx) is a variance of Rx.

10. The method for evaluating the brightness measurement accuracy of the Demura equipment of claim 2, wherein the added random number is a value between ±10.

11. The method for evaluating the brightness measurement accuracy of the Demura equipment of claim 2, wherein the correlation is $$r = \frac{cov(Rx_{Measure}, Rx)}{\sqrt{var(Rx_{Measure}) * var(Rx)}};$$

wherein Rx refers to the added random number, $Rx_{Measure}$ refers to the measured value corresponding to the added random number, $Cov(Rx_{Measure}, Rx)$ is a covariance of $Rx_{Measure}$ and Rx, $Var(Rx_{Measure})$ is a variance of $Rx_{Measure}$, and Var(Rx) is a variance of Rx.

12. The method for evaluating the brightness measurement accuracy of the Demura equipment of claim 6, wherein a method of adding random numbers is to superimpose one random number on each of the sub-pixels or to superimpose one random number on a few pixels per cycle, or to superimpose one random number on a random position.

13. The method for evaluating the brightness measurement accuracy of the Demura equipment of claim 6, wherein the added random number is a value between ±10.

14. The method for evaluating the brightness measurement accuracy of the Demura equipment of claim 6, wherein the correlation is $$r = \frac{cov(Rx_{Measure}, Rx)}{\sqrt{var(Rx_{Measure}) * var(Rx)}};$$

wherein Rx refers to the added random number, $Rx_{Measure}$ refers to a measured value corresponding to the added random number, $Cov(Rx_{Measure}, Rx)$ is a covariance of $Rx_{Measure}$ and Rx, $Var(Rx_{Measure})$ is a variance of $Rx_{Measure}$, and Var(Rx) is a variance of Rx.

15. The method for evaluating the brightness measurement accuracy of the Demura equipment of claim 3, wherein the added random number is between 2 and 10.

16. The method for evaluating the brightness measurement accuracy of the Demura equipment of claim 8, wherein the added random number is between 2 and 10.

17. The method for evaluating the brightness measurement accuracy of the Demura equipment of claim 10, wherein the added random number is between 2 and 10.

18. The method for evaluating the brightness measurement accuracy of the Demura equipment of claim 13, wherein the added random number is between 2 and 10.

* * * * *